US007573534B2

(12) United States Patent
Kwon

(10) Patent No.: US 7,573,534 B2
(45) Date of Patent: Aug. 11, 2009

(54) DIGITAL DISPLAY APPLIANCE AND METHOD FOR OUTPUTTING VIDEO DATA

(75) Inventor: Sun Kyu Kwon, Kyungsangbuk-Do (KR)

(73) Assignee: LG Electronics Inc., Seoul (KR)

(*) Notice: Subject to any disclaimer, the term of this patent is extended or adjusted under 35 U.S.C. 154(b) by 561 days.

(21) Appl. No.: 10/726,649

(22) Filed: Dec. 4, 2003

(65) Prior Publication Data

US 2004/0174466 A1 Sep. 9, 2004

(30) Foreign Application Priority Data

Dec. 6, 2002 (KR) ..................... 10-2002-0077198

(51) Int. Cl.
*H04N 5/268* (2006.01)

(52) U.S. Cl. ....................................... 348/705; 348/572

(58) Field of Classification Search ................. 348/705, 348/706, 572, 573, 554; 341/160, 155; *H04N 5/268*
See application file for complete search history.

(56) References Cited

U.S. PATENT DOCUMENTS 4,994,913 A * 2/1991 Maeshima ................... 348/22
5,036,395 A * 7/1991 Reimers ...................... 348/722
5,287,188 A * 2/1994 Saeger et al. ................ 348/565
6,229,575 B1 * 5/2001 Vaughan et al. ............. 348/564
6,437,834 B1 * 8/2002 Tagami ....................... 348/705
6,529,904 B1 * 3/2003 Elsbernd et al. ............. 348/572

* cited by examiner

*Primary Examiner*—Sherrie Hsia
(74) *Attorney, Agent, or Firm*—KED & Associates, LLP

(57) ABSTRACT

Disclosed are an apparatus and method for outputting digital video data in a display appliance. The digital video data outputting apparatus includes data converting units for converting various kinds of analog video signals into digital video data, an output signal selector for receiving outputs of the data converting units and selecting any one of the received outputs, and an encoding unit for encoding the output of the output signal selector.

27 Claims, 6 Drawing Sheets

DIGITAL DISPLAY APPLIANCE AND METHOD FOR OUTPUTTING VIDEO DATA

BACKGROUND OF THE INVENTION

1. Field of the Invention

The present invention relates to a display appliance, and more particularly, to an apparatus and method for outputting digital video data in a display appliance.

2. Description of the Related Art

Referring to FIG. 1 showing a block diagram of a conventional apparatus for receiving/transmitting digital video data, a transmitter 100 includes a video processor 102 and a D/A converter 104, and a receiver 106 includes an A/D converter 108 and a video processor 110.

The digital video data outputted from the video processor 102 of the transmitter 100 is converted into an analog video signal by the D/A converter 104. The analog video signal is transmitted to the receiver 106 via a D-sub cable or the like. The A/D converter of the receiver 106 converts the analog video signal received via the D-sub cable into the digital video data.

The digital video data is inputted to the digital video processor 110. The video processor 110 converts and outputs the digital video data which is suitable to be displayed. The analog video signal transmitted through the D-sub cable consists of R, G, B, and horizontal and vertical sync signals.

With the construction as described above, the digital video data is converted into the analog video signal and then the analog video signal is converted into the digital video data, which causes damage to the digital video data.

In order to solve the above problem, DDWG (Digital Display Working Group) addresses the requirement for a digital interface system transmitting the digital video data in a digital mode. According to DVI (Digital Visual Interface), which is a digital interface system, developed by the DDWG, a transmitting side encodes an input data and various control signals to transmit them via a dedicated connector, while a receiving side decodes the encoded data. The DVI includes TMDS (Transition Minimized Differential Signaling), LVDS (Low Voltage Differential Signaling), GVIF (Gigabit Video Interface) or the like.

Referring to FIG. 2 showing a block diagram of a transmitter/receiver of TMDS, data inputted to a transmitter 200 includes first digital video data B, second digital video data G, third digital video data R, horizontal and vertical sync signals, first to fourth control data, DE and a clock. A first encoder 202 of the transmitter 200 receives and encodes the first digital video data B, the horizontal and vertical sync signals and the DE, and converts them into serial data to transmit them via a first channel of a TMDS link. A second encoder 204 of the transmitter 200 receives and encodes the second digital video data G, the first and second control data and DE, and converts them into serial data to transmit them via a second channel of the TMDS link. Further, a third encoder 206 of the transmitter 200 receives and encodes the third digital video data R, the third and fourth control data and DE, and converts them into serial data to transmit them via a third channel of the TMDS link. The clock is transmitted via a fourth channel of the TMDS link as is.

A first encoder 210 of the receiver 208 receives the signals inputted via the first channel of the TMDS link, converts the signals into parallel data, and decodes the signals to output the first digital video data B, the horizontal and vertical sync signals and the DE0. A second decoder 212 receives the signals inputted via the second channel of the TMDS link, coverts the signals into parallel data, and decodes the signals to output the second digital video data G, the first and second control data and DE1. A third decoder 214 receives the signals inputted via the third channel of the TMDS link, converts the signals into parallel data, and decodes the signals to output the third digital video data R, the third and fourth control data and DE2.

The output data of the first to third decoders 210 to 214 and the clock received via the fourth channel of the TMDS link are inputted to an inter-channel arranging unit 216. The inter-channel arranging unit 216 arranges various inputted data and the clock to output them in the same format as the inputted format.

The DVI connector includes a DVI-D connector capable of transmitting/receiving only the digital video data, and a DVI-I connector capable of transmitting/receiving the digital video data and the analog video signal.

Referring to FIG. 3 showing a view of the pin arrangement of the DVI-D connector, the DVI-D connector includes 12 pins for transmitting the digital video data, 2 pins for transmitting the clock, and 4 pins for DDC.

Referring to FIG. 4 showing a view of pin arrangement of the DVI-I connector, the DVI-I connector includes 12 pins for transmitting the digital video data, 2 pins for transmitting the clock, 4 pins for DDC, R, G and B pins for transmitting the analog video signal, and pins for transmitting the horizontal and vertical sync signals.

A conventional apparatus for processing the digital video data inputted in the DVI mode in the display appliance will now be described with reference to FIG. 5.

The digital video processing apparatus includes a video decoder 300 for receiving and decoding a TV signal to output the decoded signal to a first multiplexer 304, and a component processor 302 for receiving and decoding the DVD signal to output the decoded signal to the first multiplexer 304. The first multiplexer 304 provides a scaler 318 with any one of outputs of the video decoder 300 and a component processor 302 by control of a microprocessor (not shown).

A first A/D converter 306 receives the analog RGB signal and converts analog to digital to output the converted signal to a second multiplexer 316. A second A/D converter 308 receives the analog RGB signal inputted via the DVI connector and converts analog to digital to output the converted signal. A DVI decoder 310 decodes the DVI video data inputted through the DVI connector. The data outputted from the DVI decoder 310 is 8:8:8 RGB digital video data. A signal detecting unit 312 detects whether there is a signal in an analog RGB signal input terminal of the DVI connector and a DVI data input terminal, and generates a selection signal according to the detected results. A switching unit 314 selects any one of outputs of the second 2A/D converter 308 and DVI decoder 310 to output the selected output to the second multiplexer 316. The second multiplexer 316 provides the scaler 318 with any one of outputs of the first A/D converter 306 and switching unit 314 by the control of the microprocessor (not shown).

The scaler 318 scales the digital video data supplied from the first and second multiplexers 304 and 316 to apply the scaled data to the D/A converter 320. The D/A converter 320 converts the digital video data outputted from the scaler 318 into analog video data.

Some display appliances used commonly do not receive TV signal, DVD signal or the like due to spatial or using restrictions.

Therefore, it is required to develop a method for outputting digital video data in a display appliance capable of processing only digital video data.

SUMMARY OF THE INVENTION

Accordingly, the present invention is directed to an apparatus and method for outputting digital video data that substantially obviates one or more problems due to limitations and disadvantages of the related art.

It is an object of the present invention to provide an apparatus and method for outputting digital video data in a display appliance which can receive an analog video signal and converts the signal into DVI video data to output the video data to another display appliance, so that even a display appliance which cannot process the analog video signal can output an image corresponding to the analog video signal.

To achieve these objects and other advantages and in accordance with the purpose of the invention, as embodied and broadly described herein, there is provided a digital video data outputting apparatus in a display appliance, comprising: data converting units for converting various types of analog video signals into digital video data, respectively; an output signal selector for receiving outputs of the data converting units and selecting any one of the received outputs; and an encoding unit for encoding the output of the output signal selector.

Another aspect of the present invention is to provide a method for outputting digital video data in a display appliance, comprising the steps of: converting video signals inputted to the display appliance into digital video data of a desired format; selecting any one of the digital video data and DVI-encoding the selected data; and outputting the encoded digital video data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, an example of which is illustrated in the accompanying drawings.

A display appliance according to one preferred embodiment of the present invention receives an analog video signal and converts the signal into DVI video data to output the data to another display appliance, so that a display appliance which cannot process the analog video signal may output an image corresponding to the analog video signal.

Figure 1:
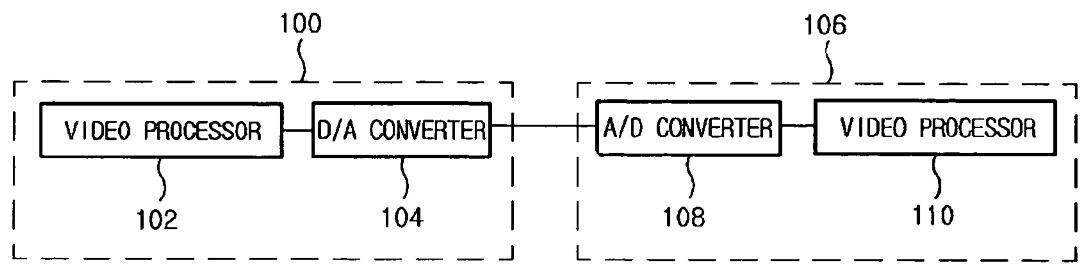
FIG. 1 is a block diagram of a conventional apparatus for receiving/transmitting digital video data.
Figure 2:
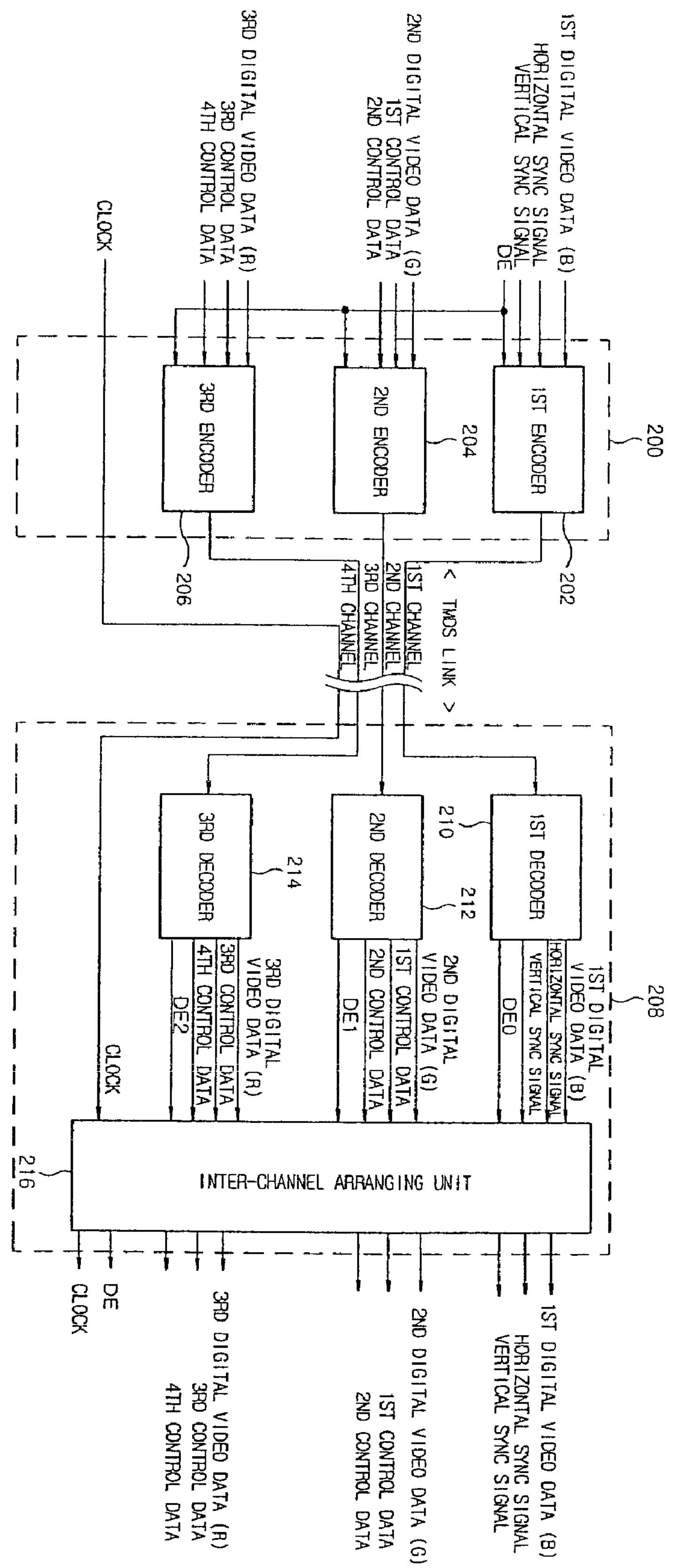
FIG. 2 is a block diagram of a conventional transmitter/receiver of TMDS.
Figure 3:
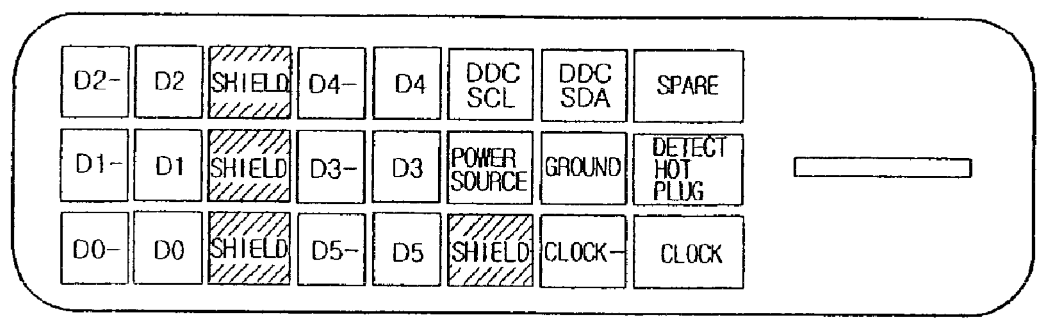
FIG. 3 is a view of the pin arrangement of a DVI-D connector.
Figure 4:
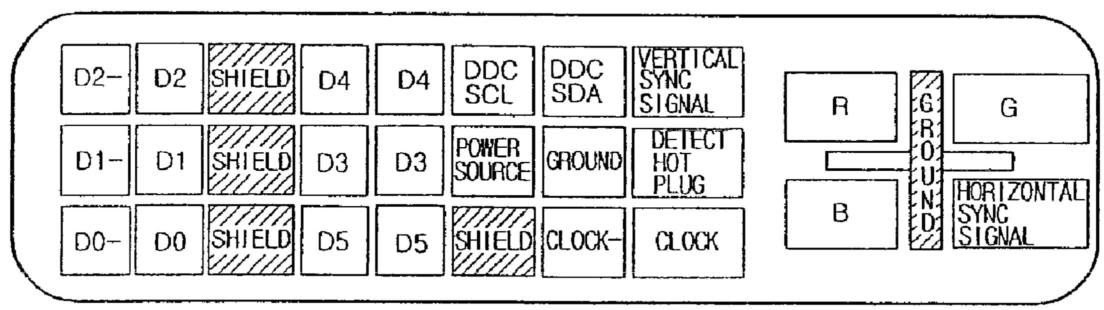
FIG. 4 is a view of the pin arrangement of a DVI-I connector.
Figure 5:
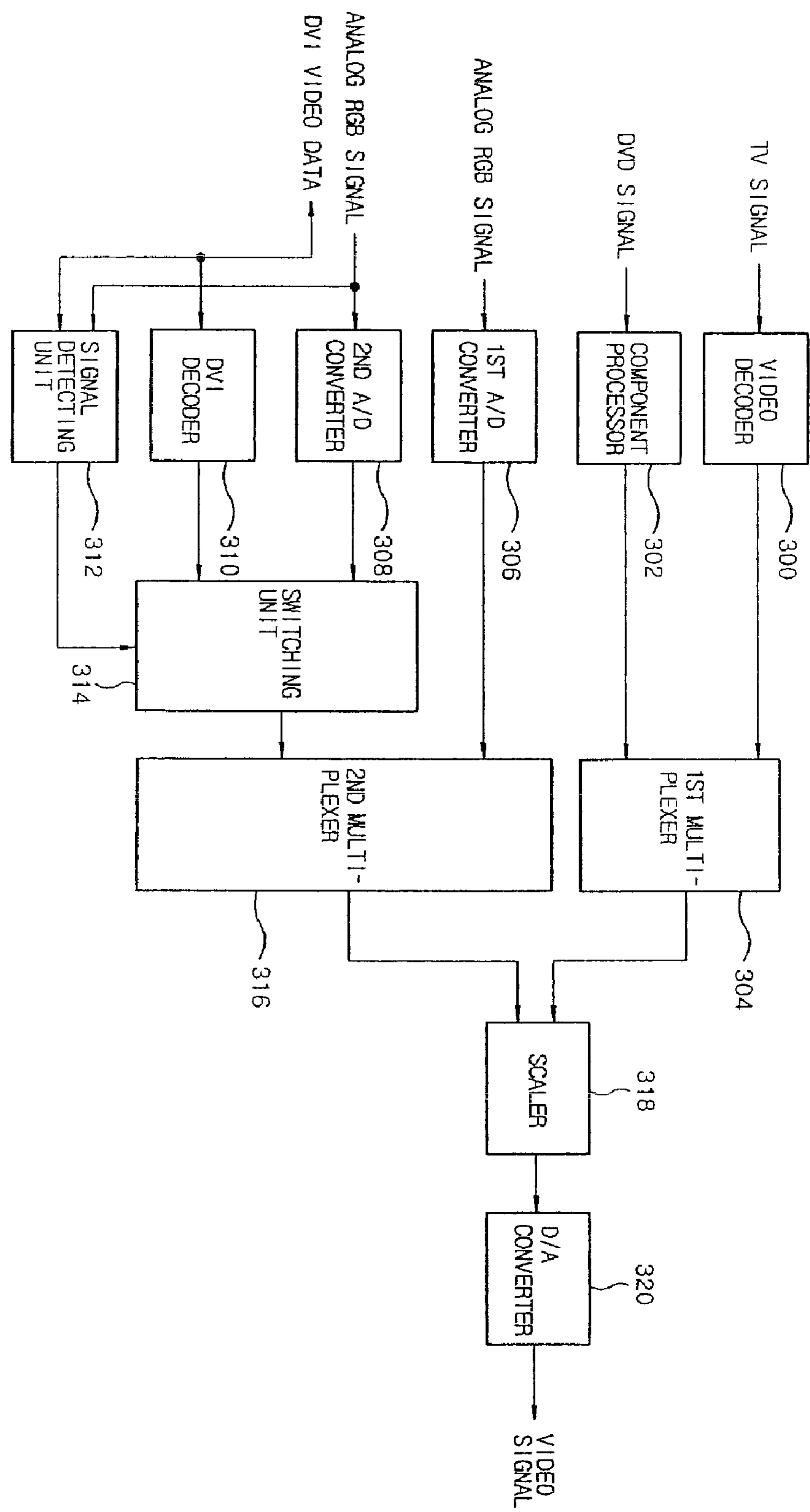
FIG. 5 is a block diagram of a conventional digital audio data processing apparatus.
Figure 6:
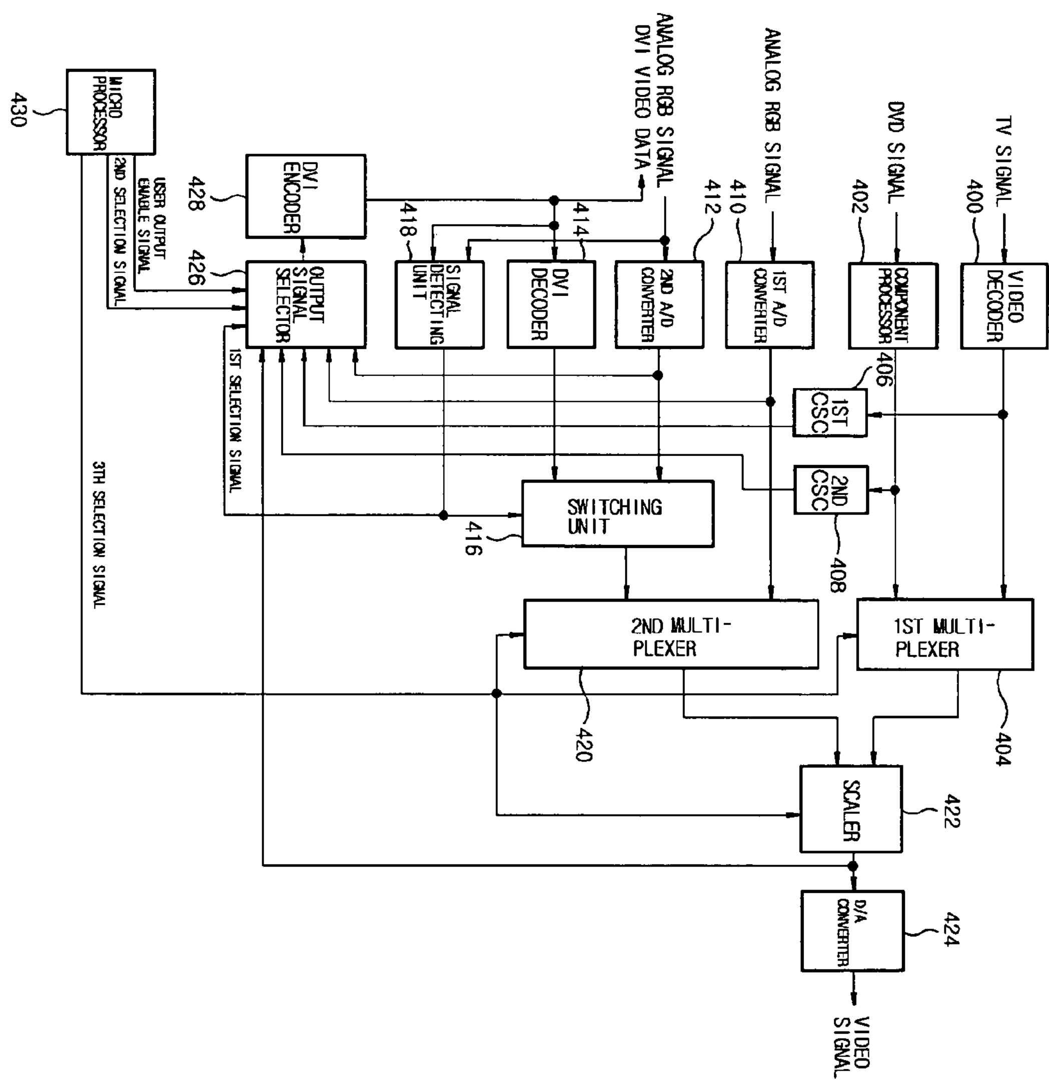
FIG. 6 is a block diagram of a digital audio data processing apparatus according to one preferred embodiment of the present invention.

An apparatus for processing digital video data in the display appliance according to one preferred embodiment of the present invention will now be described with reference to FIG. 6.

The digital video data processing apparatus receives a TV signal which is an analog video signal, a DVD signal, and analog RGB signals, and also receives an analog RGB signal and DVI video data via a DVI-I connector.

A video decoder 400 receives the TV signal and converts the signal into YIQ or YUV data, of which a luminance component and a color component are divided, and vertical and horizontal sync signals to output YcbCr data. An output of the video decoder 400 is inputted to a first multiplexer 404 and a first CSC (Color Space Converter) 406. The first CSC 406 color coordinate transforms the output of the video decoder 400 to apply it to an output signal selector 426 as first digital RGB data. A component processor 402 converts a DVD signal into the YcbCr data and sync data. The output of the component processor 402 is inputted to the first multiplexer 404 and a second CSC 408. The second CSC 408 color coordinate transforms the output of the component processor 402 to apply it to the output signal selector 426 as second digital RGB data.

A first A/D converter 410 converts the analog RGB signal inputted via a D-sub connector into third digital RGB data. The third digital RGB data is inputted to a second multiplexer 420 and the output signal selector 426. A second A/C converter 412 converts the analog RGB signal inputted via a DVI-I connector into fourth digital RGB data. The fourth digital RGB data is inputted to a switching unit 416 and the output signal selector 426. A DVI decoder 414 decodes the DVI video data inputted via the DVI-I connector to output fifth digital RGB data. The fifth digital RGB data is inputted to the switching unit 416 and the output signal selector 426.

A signal detector 418 connects a pull-up resistor with an analog RGB signal input terminal and a DVI video data input/output terminal of the DVI-I connector. If a signal exists in the analog RGB signal input terminal, the signal detector 418 outputs a signal of '0' level. Meanwhile, if a signal exists in the DIV video data input/output terminal, the signal detector 418 outputs a signal of '1' level. The output of the signal detector 418 is called a first selection signal. The first selection signal is inputted to the switching unit 416 and the output signal selector 426. The switching unit 416 selects one of the outputs of the second A/D converter 412 and DVI decoder 414 according to the first selection signal to apply the selected output to the second multiplexer 420.

The first multiplexer 404 applies at least one of the outputs of the video decoder 400 and component processor 402 to the scaler 422 by control of the microprocessor 430. The second multiplexer 420 applies at least one of the outputs of the first A/D converter 410 and switching unit 416 to the scaler 422 by control of the microprocessor 430.

The scaler 422 receives the output of the first multiplexer 404 via the video input terminal, and also receives the output of the second multiplexer 420 via a graphic input terminal. Whether the two input terminals of the scaler 422 are valid is determined by a type of multi mode output of the interested display appliance.

The scaler 422 processes "amplification", "contraction", "inversion", "keystone", "brightness" and "darkness" for the digital video data inputted under the control of the microprocessor 430, and applies the results to the D/A converter 424. The D/A converter 424 converts the output of the scaler 422.

The output signal selector 426 selects any one of the first to fifth digital RGB data by combining the first selection signal, the second selection signal of the microprocessor 430 and a user output enable signal to apply the selected data to the DVI encoder 428. The DVI encoder 428 encodes the digital RGB data outputted from the output signal selector 426, and coverts the encoded digital RGB data into the DVI video data to output the result via the DVI video data input/output terminal.

Figure 7:
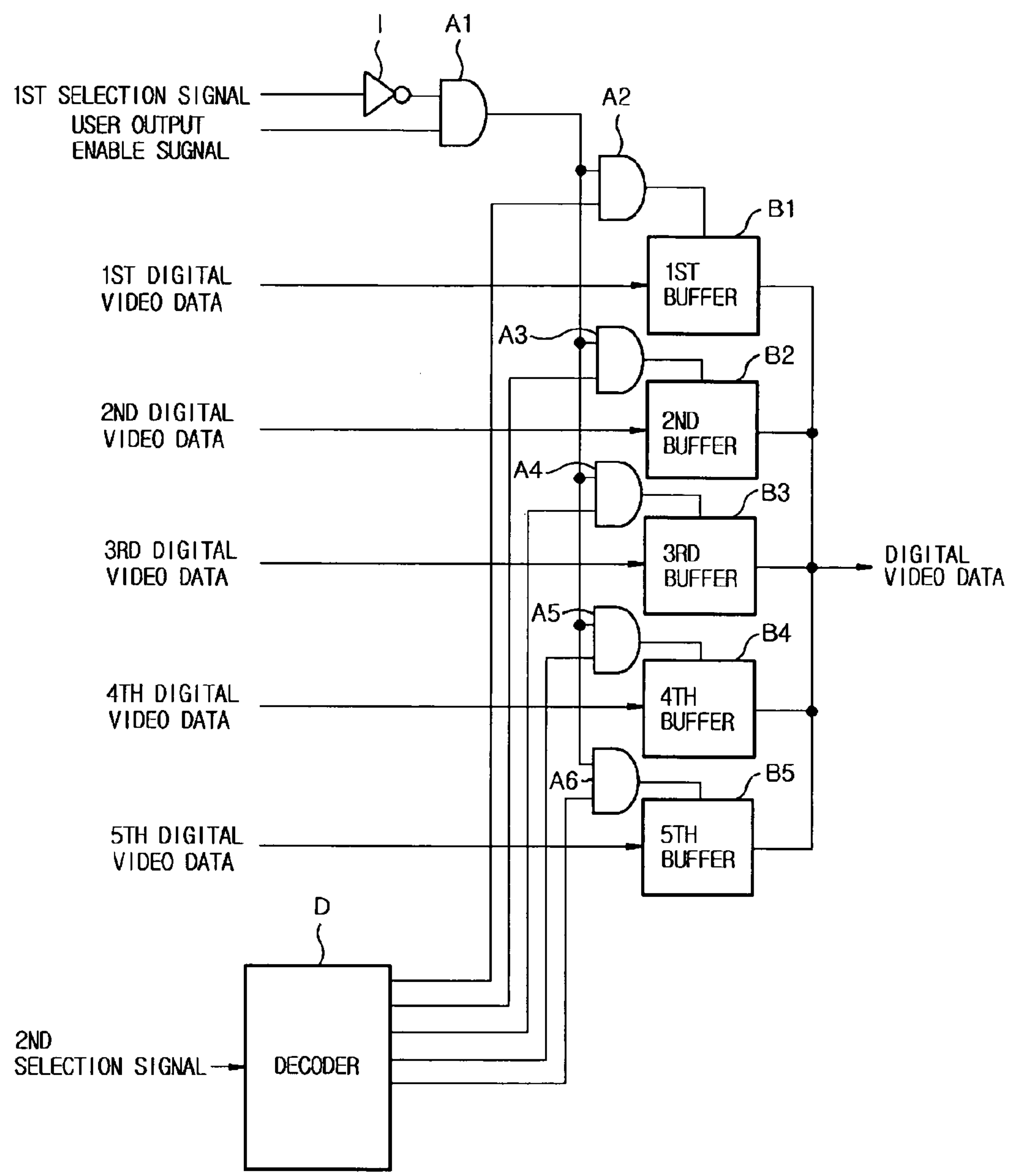
FIG. 7 is a detailed block diagram of the output signal selector in FIG. 6.

Construction and operation of the output signal selector 426 will now be described with reference to FIG. 7.

The first selection signal is inverted by an inverter I of the output signal selector 426 and then is inputted to a first AND gate A1. The first AND gate A1 takes an AND gate of the first inversed selection signal and the user output enable signal. If a user commands the DVI video data input/output terminal to output the DVI video data in the state that a signal does not exist in the DVI video data input/output terminal, the first AND gate outputs "1", while in other cases, the first AND gate outputs "0". The output of the first AND gate A1 is inputted to the second to sixth AND gates A2 to A6.

A decoder D decodes the second selection signal provided from the microprocessor 430, and generates outputs corresponding to the second to sixth AND gates A2 to A6, respectively. The outputs are to enable the first to fifth buffers B1 to B5.

The output terminals of the second to sixth AND gates A2 to A6 are connected to the enable terminals of the first to fifth buffers B1 to B5, respectively. The second to sixth AND gates A2 to A6 receive the outputs of the decoder D one by one, and simultaneously receive the output of the first AND gate A1. If two signals are "1", the interested buffer is enabled.

The first to fifth buffers B1 to B5 receive the first to $N^{th}$ digital RGB data, and buffers only the digital RGB data supplied when the buffer is enabled.

With the above description, since the apparatus of the present invention receives the analog video signal and converts the signal into a digital video data, a display appliance which cannot process the analog video signal may output an image corresponding to the analog video signal.

The foregoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A digital video data outputting apparatus in a display appliance, comprising:

data converters for converting different analog video signals into digital video data respectively;

an output signal selector for receiving outputs of the data converters and selecting any one of the received outputs; and an encoder for encoding the output of the output signal selector, wherein any one of the data converters includes:

a video decoder for decoding a TV signal, and a color coordinate transformer for transforming an output of the video decoder into digital RGB data to apply the data to the output signal selector.

2. The digital video data outputting apparatus as claimed in claim 1, wherein any one of the data converters includes a component processor for receiving and processing a DVD signal.

3. A digital video data outputting apparatus in a display appliance, comprising:

data converters for converting different analog video signals into digital video data respectively;

an output signal selector for receiving outputs of the data converters and selecting any one of the received outputs; and an encoder for encoding the output of the output signal selector, wherein any one of the data converters includes:

a component processor for receiving and processing a DVD signal, and a color coordinate transformer for transforming an output of the component processor into digital RGB data to apply the transformed data to the output signal selector.

4. A digital video data outputting apparatus in a display appliance, comprising:

data converters for converting different analog video signals into digital video data respectively;

an output signal selector for receiving outputs of the data converters and selecting any one of the received outputs;

an encoder for encoding the output of the output signal selector; and a selecting circuit for selecting an output of one of the data converters for display, wherein a signal based on the output selected by the selecting circuit is input into the output signal selector.

5. The digital video data outputting apparatus as claimed in claim 4, further comprising:

a scaler connected between the selecting circuit and output signal selector for scaling an output of the selecting circuit, the scaler to apply the scaled output to the output signal selector.

6. A digital video data outputting apparatus in a display appliance, comprising:

one or more first data converters for converting a first plurality of analog video signals into digital video data;

a signal detector for detecting an input state of video signals inputted to at least one of the first data converters;

a switching unit for receiving video data outputted from the first data converters and selecting the video data according to the detected result of the signal detector;

second data converters for converting a second plurality of analog video signals into digital video data;

at least one multiplexer for selecting video data outputted from the switching unit and the second data converters;

a scaler for scaling the digital video data outputted from the at least one multiplexer;

an output signal selector for selecting any one of digital video data outputted from the scaler, the digital video data outputted from one of the first data converters, or the digital video data outputted from one of the second data converters;

a digital visual interface (DVI) encoder for DVI-encoding the digital video data outputted from the output signal selector; and a controller for controlling the output signal selector.

7. The digital video data outputting apparatus as claimed in claim 6, further comprising:

a color coordinate transformer, connected between one of the second converters and the output signal selector, for color coordinate transforming an output of said one of the second data converters.

8. The digital video data outputting apparatus as claimed in claim 6, wherein the first data converters include an analog-to-digital converter and a DVI decoder.

9. The digital video data outputting apparatus as claimed in claim 6, wherein said input state includes one of a first state indicative of no video signals input into said at least one of the first data converters and a second state indicative of the presence of video signals input into said at least one of the first data converters.

10. A method for outputting digital video data in a display appliance, comprising:

a) converting video signals inputted to the display appliance into a plurality of digital video data signals of one or more predetermined formats;

b) selecting one of the digital video data signals and digital visual interface (DVI)-encoding the selected data signal; and c) outputting the DVI-encoded digital video data signal, wherein the selecting includes selecting one of the digital video data signals based on whether a predetermined input terminal of the display appliance has received one of said video signals.

11. The method for outputting digital video data as claimed in claim 10, further comprising:

selecting one or more of the digital video data signals converted into one of the predetermined formats; and processing the selected digital video data signal to be displayed, wherein the selecting includes selecting the processed video data signal or one of the digital video data signals converted into one of the predetermined formats.

12. The method for outputting digital video data as claimed in claim 11, wherein processing the selected digital video data to be displayed is performed by a scaling process.

13. A method for outputting digital video data in a display appliance comprising:

a) converting video signals inputted to the display appliance into a plurality of digital video data signals of one or more predetermined formats;

b) selecting one of the digital video data signals and digital visual interface (DVI)-encoding the selected data signal; and c) outputting the DVI-encoded digital video data signal, wherein the selecting includes selecting one of the digital video data signals based on whether a predetermined input terminal of the display appliance has received one of said video signals, wherein the video signals input into the display appliance include at least one of a TV signal, a DVD signal, an analog RGB signal, or a DVI video data, and wherein said method further comprises color-converting digital video data corresponding to at least one of the TV or the DVD signal, and wherein the selecting includes selecting the at least one color-converted digital video data signal or other ones of the digital video data signals converted into one of the predetermined formats.

14. The method for outputting digital video data as claimed in claim 13, wherein the TV signal is decoded and converted into one of the predetermined formats of digital video data, the DVD signal is component-processed and is converted into one of the predetermined formats of digital video data, the analog RGB signal is converted into one of the predetermined formats of digital video data, and the DVI video data is DVI decoded into one of the predetermined given formats of digital video data.

15. An apparatus, comprising:

a plurality of converters to convert different analog video signals into respective digital video data signals;

a detector to detect whether a predetermined input terminal of the apparatus has received one of said analog video signals;

a first selector to select one of the digital video data signals based on a first selection signal from the detector; and an encoder to encode the selected digital video data signal to generate video data in a predetermined format, wherein the first selector selects one of the digital video data signals based on the first selection signal and a second selection signal, the second selection signal corresponding to one of the digital video signals output from the converters.

16. The apparatus of claim 15, wherein the first selector selects one of the digital video data signals based on the first selection signal, the second selection signal, and a user enable signal.

17. The apparatus of claim 15 further comprising:

a second selector to select one of the digital video data signals for processing, wherein the first selector selects one of the digital video data signals or the processed digital video data signal based on the first selection signal.

18. The apparatus of claim 17, wherein the first selector selects one of the digital video data signals or the processed digital video signal based on the first selection signal and the second selection signal, the second selection signal corresponding to one of the digital video signals output from the converters.

19. The apparatus of claim 18, wherein the first selector selects one of the digital video data signals based on the first selection signal, the second selection signal, and a user enable signal.

20. The apparatus of claim 17, wherein said processing includes a scaling operation.

21. The apparatus of claim 15, wherein said predetermined format is a digital visual interface (DVI) format.

22. The apparatus of claim 15, wherein one of the converters includes a component processor for processing a DVD signal corresponding to one of the analog video signals.

23. An apparatus comprising:

a plurality of converters to convert different analog video signals into respective digital video data signals;

a detector to detect whether a predetermined input terminal of the apparatus gas received one of said analog video signals;

a first selector to select one of the digital video data signals based on a first selection signal form the detector;

an encoder to encode the selected digital video data signal to generate video data in a predetermined format; and a decoder for decoding the digital video signal output form the encoder for display.

24. The apparatus of claim 23, further comprising:

a second selector to select a signal output of the decoder or a digital video signal output from one of the converters based on the first selection signal, the signal selected by the second selector being processed for display.

25. The apparatus of claim 23, wherein said predetermined format is a digital visual interface (DVI) format and the decoder is a digital visual interface (DVI) decoder.

26. An apparatus comprising:

a plurality of converters to convert different analog video signals into respective digital video data signals;

a detector to detect whether a predetermined input terminal of the apparatus has received one of said analog video signals;

a first selector to select one of the digital video data signals based on a first selection signal from the detector; and an encoder to encode the selected digital video data signal t generate video data in a predetermined format, wherein at least one of the converters includes:

a video decoder to decode a TV signal, and a color coordinate transformer to transform an output of the video decoder for input into the first selector.

27. An apparatus comprising:

a plurality of converters to convert different analog video signals into respective digital video data signals;

a detector to detect whether a predetermined input terminal of the apparatus has received one of said analog video signals;

a first selector to select one of the digital video data signals based on a first selection signal from the detector; and an encoder to encode the selected digital video data signal t generate video data in a predetermined format, wherein one of the converters includes:

a component processor to process a DVD signal corresponding to one of the analog video signal, and;

a color coordinate transformer to transform an output of the component processor into digital RGB data for input into the first selector.

* * * * *